Sept. 28, 1948.　　　　O. HOFFMAN　　　　2,450,236
HAND PROPELLED WHEELED CULTIVATOR
Filed Dec. 29, 1945　　　　　　　　　　2 Sheets-Sheet 1
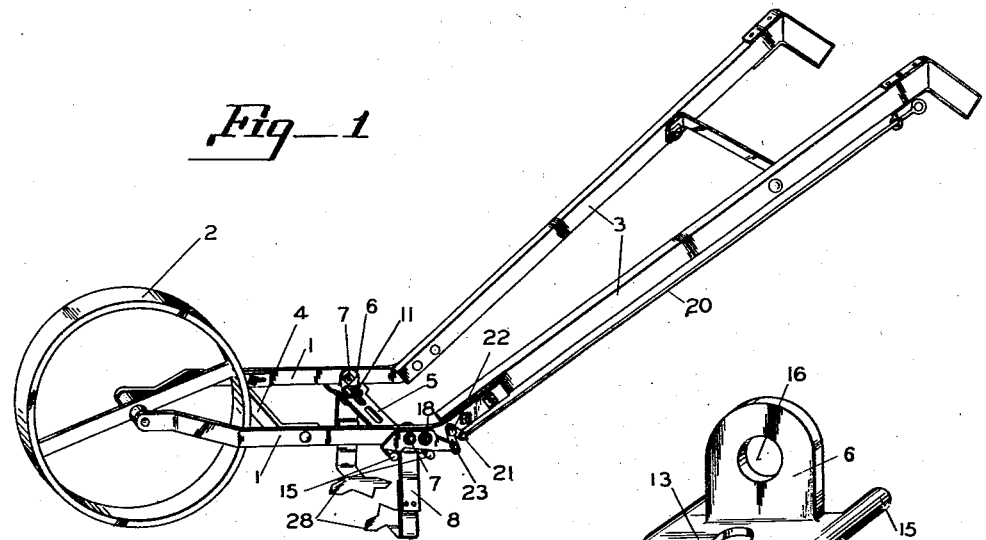
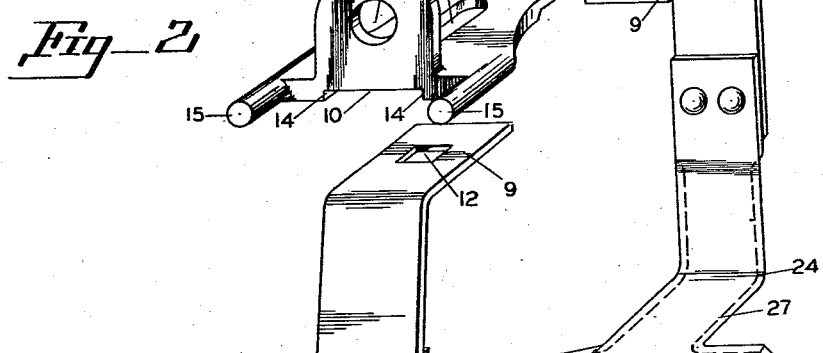
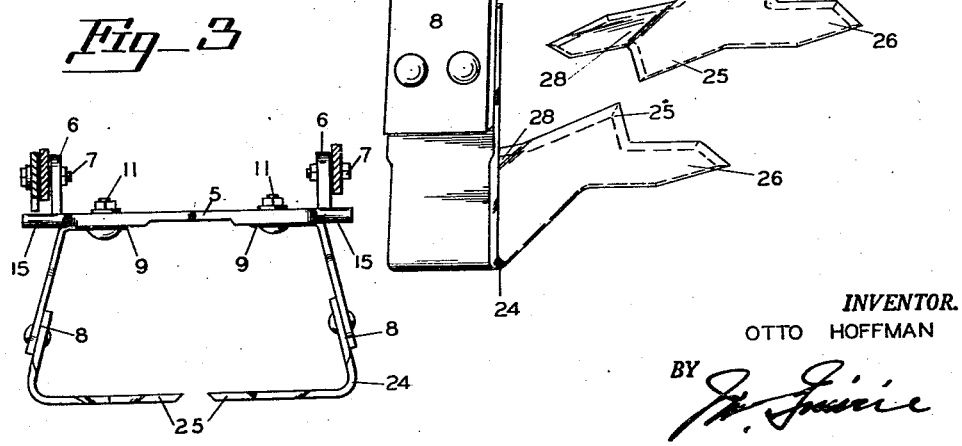
INVENTOR.
OTTO HOFFMAN
ATTORNEY Sept. 28, 1948. O. HOFFMAN 2,450,236
HAND PROPELLED WHEELED CULTIVATOR
Filed Dec. 29, 1945 2 Sheets-Sheet 2
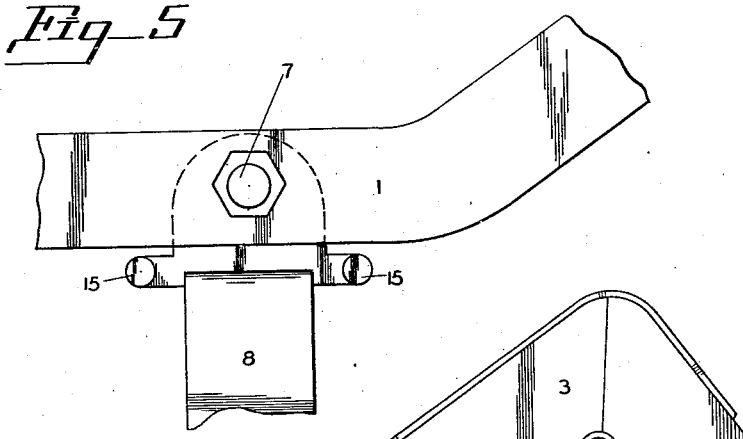
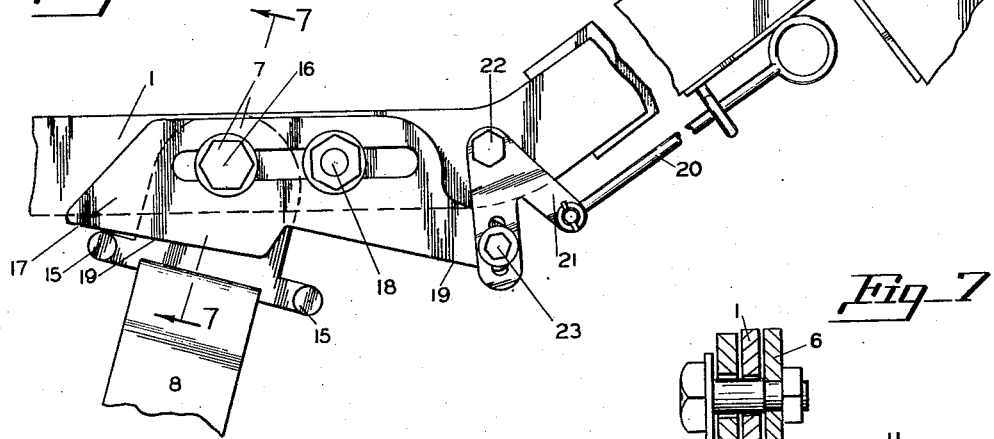
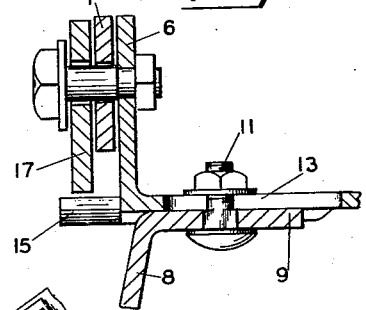
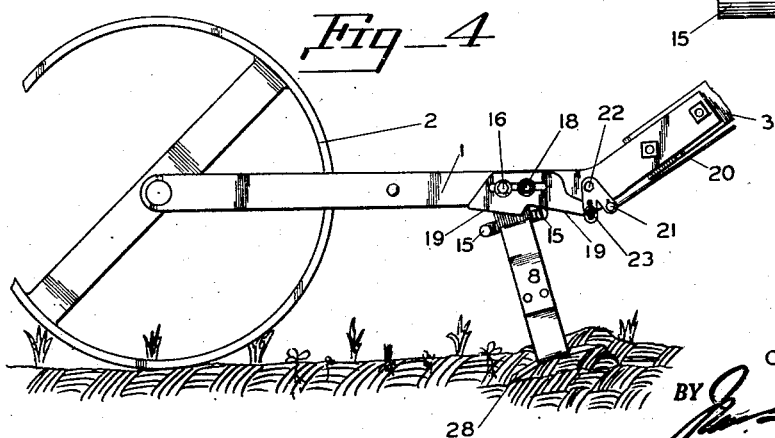
INVENTOR.
OTTO HOFFMAN
ATTORNEY Patented Sept. 28, 1948

2,450,236

UNITED STATES PATENT OFFICE 2,450,236

HAND PROPELLED WHEELED CULTIVATOR

Otto Hoffman, Portland, Oreg.

Application December 29, 1945, Serial No. 637,984

2 Claims. (Cl. 97—59)

This application is an improvement over my Patent No. 2,191,741 issued February 27, 1940.

The primary object of my invention is to mount cultivator shoes to a rockable tool holder mounted in a cultivator frame. The object of the rockable tool holder for holding the cultivator shoes is to change the angle of the cultivator shoes relative to the ground surface.

A further object of the invention is to provide a means of changing this angle of the cultivator shoes at will by the operator while forcing the cultivator shoes through the work in the cultivating operation.

I have found in the use of my new and improved cultivator that by adjusting or changing the angle of the cultivator shoes in regard to the ground surface when either forcing the cultivator forward or backward provides a more efficient cultivating tool.

A further object of my invention resides in the construction of the pivotally mounted bar to which the cultivator tools are adjustably mounted, from one piece of material, preferably a casting. In this present application I have eliminated some parts, as for instance clamps in the mounting of the cultivator tool to the holding bar.

A still further object of my invention is the reshaping or redesigning of the cultivator blades themselves.

These and other incidental objects will be apparent in the drawings, specifications and claims.

Referring to the drawings:

Figure 1 is a perspective side view of my new and improved cultivator.

Figure 2 is an exploded view of the pivotally mounted holding bar and the cultivator tools.

Figure 3 is a sectional view, taken through the cultivator frame, having another preferred form of cultivating shoe mounted thereto.

Figure 4 is a fragmentary side view illustrating the holding bar and the cultivator tool rocked at an angle to the cultivator frame, causing the cultivator tools to be moved underneath the ground surface.

Figure 5 is a detailed fragmentary view of the frame, tool holder bar and part of the tool shown in neutral or half-way position, the adjustable cam stop being eliminated.

Figure 6 is an enlarged fragmentary detailed view illustrating the means of limiting or adjusting the angle or arc of the cultivator tool, parts broken out for convenience of illustration.

Figure 7 is a fragmentary sectional view, taken on line 7—7 of Figure 6.

In the drawings:

My new and improved cultivator consists of two side frames 1 mounted to the wheel 2, having handles 3 secured to its opposite end, both sides of the frame being secured together by the bar 4 as best illustrated in Figure 1. The bar 4 not only spaces the side frames 1 apart, but it is adjustable so that it can be moved away or towards the wheel 2 providing an adjustable scraper for removing foreign material from the rim of the wheel.

A cross bar or tool holder 5 has each of its upwardly turned ends 6 pivotally mounted to the side frame by the bolt 7. The cultivator tools 8 have their upper ends 9 turned at right angles. The ends 9 fit into the channel 10 of the bar 5 and can be adjusted towards or away from one another along the channel. Bolts pass through the holes 12 of the tools 8 and through the slots 13 formed in the bar 5, holding them together. The sides 14 of the channel 10 keeps the tools 8 in definite alignment while the bolts 11 hold the same in place. Formed on the ends of the bar 5 are outwardly extending arms 15 which are provided for limiting the angle or arc that the bar or tool holder can be moved, as best illustrated in Figures 4 and 6.

One of the features in this application which is different than the construction shown in the above mentioned patent is that the bar 5 has been provided with the extending arms 15 and has the channel 10 formed therein. The arms 15 providing for a greater stopping leverage and the channel 10 eliminating an extra clamp that had to be used in order to hold the tools 8 in alignment with the bar 5 in my former patent.

Another improvement in this cultivator arrangement is the fact that I have provided a device for adjusting the degree of arc about which the tools 8 can move about the pivot point 16. This device consists of a cam 17 slidably mounted adjacent the pivot point 16 under the head of the bolts 7 and 18. Inclined cam surfaces 19 are formed on the lower side of the cam 17 against which the arms or stops 15 contact when the tool holder bar 5 and the tools 8 are rocked about their pivot point 16.

A control rod 20 is secured to the bell crank 21, which is pivotally mounted at 22, having its opposite crank pivotally connected to the cam at 23. This control rod may be moved by the fingers of the operator thereby changing the position of the cam 17 and its faces 19 relative to the arch of the stop arms 15. This adjustment can be made at will, which is highly beneficial in the operation of the cultivator.

Referring to Figure 5, I have illustrated the tool holding bar 5 and its stop arms 15 working independent of the adjustable cam 17, which in this view I have eliminated as in some cases this cam would not be installed, the stop arms 15 contacting the frame 1 direct.

Referring to Figures 2 and 3, it will be noted that the corners 24 are rounded so as to avoid injuring the plants while cultivating the same. I have found that best results are obtained with the cultivator shown best in Figure 2, wherein V-shaped points 25 extend toward one another and one point 26 extending directly away from the body of the tool on the same plane as the body portion 27, while oppositely disposed of the point 26 is a similar point bent down at 28 at a slight angle to the body portion 27, this is best illustrated in Figure 4.

I find that a cultivating shoe designed and shaped as described above provides the most efficient operation of all the points 25, 26 and 28, including the portion 27 are bevelled from the underside as indicated by the dotted lines, providing the upper surface with a perfectly flat plane.

I do not wish to be limited to the exact structure as illustrated, as other mechanical embodiment may be used still coming within the scope of the claims to follow.

I claim:

1. A cultivator including a frame, a tool carrying bar swingingly connected to the frame, tool carrying members removably secured to the frame, said bar being formed with a recess to accurately receive a portion of each member, the bar being provided with pins in spaced relation at each end of the bar with the pins extending beyond the frame, a cam member slidably mounted on the frame and in the path of movement of the pins in a swinging movement of the bar, and means for manually adjusting the cam member to control the extent of the swinging movement of the bar.

2. A cultivator including a frame, a rockable tool carrying bar mounted in the frame, independent tool carrying members connected to the bar and responding to the pivotal movement of the bar, the bar having outstanding pins in spaced relation projecting beyond the frame, and an adjustable member mounted on the frame to be selectively engaged by either of said pins to limit the swinging movement of the bar and thereby of the tool carrying members to position the tool carrying members at a desired angle to the frame.

OTTO HOFFMAN.

REFERENCES CITED

The following references are of record in the file of this patent:

UNITED STATES PATENTS

| Number | Name | Date |
|---|---|---|
| 713,866 | Fenn | Nov. 18, 1902 |
| 2,191,741 | Hoffman | Feb. 27, 1940 |